Dec. 31, 1940.    J. PLEBANSKI    2,227,155
DIRECTIONAL RADIO SYSTEM
Filed April 29, 1937    3 Sheets-Sheet 1

INVENTOR.
Jozef Plebanski
BY
ATTORNEY.

Dec. 31, 1940.  J. PLEBANSKI  2,227,155
DIRECTIONAL RADIO SYSTEM
Filed April 29, 1937   3 Sheets-Sheet 2

Fig. 40

INVENTOR.
Jozef Plebanski
BY
ATTORNEY.

Dec. 31, 1940.   J. PLEBANSKI   2,227,155
DIRECTIONAL RADIO SYSTEM
Filed April 29, 1937   3 Sheets-Sheet 3

INVENTOR.
Jozef Plebanski
BY
ATTORNEY.

Patented Dec. 31, 1940

2,227,155

UNITED STATES PATENT OFFICE 2,227,155

DIRECTIONAL RADIO SYSTEM

Jozef Plebanski, Warsaw, Poland, assignor to Radio Patents Corporation, New York, N. Y., a corporation of New York Application April 29, 1937, Serial No. 139,637
In Poland September 9, 1936

26 Claims. (Cl. 250—11)

The present invention relates to direction finding by means of radio waves, more particularly to directional receivers and a method of operating such receivers for guiding ships, airplanes or other movable craft under adverse climatic conditions such as in heavy fog, rain and other conditions of low visibility.

An object of the invention is the provision of a wireless direction finder or radio compass and a method of operating the same adapted for guiding movable craft such as a ship or airplane along a predetermined course.

Another object is the provision of a direct reading wireless direction finder or radio compass adapted to indicate the direction and/or position of a distant radio transmitter.

Still another object is the provision of a directional aerial having a polar characteristic with a cardioid or similar pattern and greatly improved directional sensitivity compared with aerials known in the prior art.

A further object is the provision of means in connection with a directional aerial system of the type comprising spaced antenna elements whereby the spacing of the antenna elements may be reduced substantially without impairing the directivity or directional sensitivity or sharpness of the polar characteristic of the system.

Still a further object is the provision of a phase control device or phaseometer adapted for producing phase shifted current components to improve the directional characteristics and sensitivity of a directional radio receiver.

Another object of the invention is the provision of a phase control arrangement or phaseometer for producing a continuously rotating phase vector of a current derived from a non-directional radio signal component for comparison with a directional signal component to determine the direction of arrival of the signal.

A more specific object of the invention is the provision of a loop or frame aerial system combined with a non-directional or open antenna to produce a cardioid shaped directional receiving diagram having increased directional sensitivity or a non-receptive sector or angle of increased sharpness compared with characteristics obtainable with directional aerial systems known in the prior art.

A further object of the invention is the provision of an improved system and method of direction finding and/or course indication for movable craft of the type comprising a directional and non-directional aerial and means for utilizing a relation of the signals received by said aerials from a common source of radiation to produce an indication of the direction of said source.

Still another object is the provision of a position finding system and method of operating the same enabling a pilot to ascertain his geographical position on a map or the like independently of any information received from a transmitting station.

Another object is the provision of a direct reading wireless direction finder or radio compass embodying means for substantially eliminating errors caused by the so-called "night effect" due to the down-coming or sky wave component of a radio signal.

The above and further objects and novel features of the invention will become more apparent from the following detailed description taken with reference to the accompanying drawings forming part of this specification and wherein

Figure 10 is a diagram of a complete radio compass system according to the invention similar to Figure 8 using a cathode ray tube as an indicator and operating purely electrically without requiring mechanically moving parts.

Figure 11 illustrates an arrangement for position finding on a movable craft employing the system and method of the invention.

Figure 12 is a side view of Figure 11.

Figure 13 illustrates schematically the arrangement of a crossed loop aerial on an aircraft for use in accordance with the invention.

Like reference characters identify like parts throughout the different views of the drawings.

With the above objects in view, the invention in general involves the use of a system for and method of converting signalling currents received by a directional aerial varying in amplitude in accordance with the direction of arrival of the signal, into currents of substantially constant amplitude and varying time phase relation adapted to improve the directional sensitivity and to effect a direct indication of the direction of arrival of a radio signal in a most reliable and efficient manner.

Figure 1:
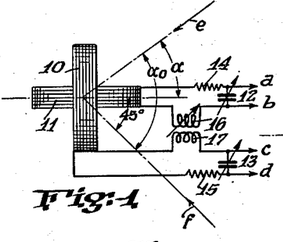
Figure 1 shows a basic circuit diagram comprising a pair of crossed loop aerials for converting currents of different amplitude relation originating from a radio signal source into currents of substantially equal amplitude and corresponding time phase relation to improve and/or serve for the direction indication.

Referring to Figure 1 of the drawings, there are shown a pair of coaxial loop or frame aerials 11 and 10 crossing each other at right angles in the example illustrated. Both loops form tuned circuits together with variable condensers 12 and 13, respectively, connected across the same in series with induction or coupling coils 16 and 17. Items 14 and 15 represent the ohmic or non-reactive impedances of the circuits which may be inherent in the circuit elements. The coils 16 and 17 are arranged in inductive coupling relation as shown.

Let it be assumed that the circuits of the loops 10 and 11 are simultaneously excited by potentials of like frequency such as by receiving signals originating from the same transmitter which signals in the example illustrated are assumed to arrive in the direction of the arrow $e$. Assuming further that the two circuits are exactly tuned to the exciting frequency or in other words that $$L_1\omega - \frac{1}{C_1\omega} = 0 \text{ and } L_2\omega - \frac{1}{C_2\omega} = 0$$

wherein $L_1$ and $L_2$ represent the inductances, $C_1$ and $C_2$ the capacities and $\omega = 2\pi f$ with $f$ representing the frequency of the exciting potential, then the currents in the two circuits may be represented by the following theoretical equations well understood by those versed in the art:

$$I_1 \sin(\omega t + \phi_1) = \frac{E_1 R_2}{Z} \sin \omega t - \frac{E_2 M \omega}{Z} \cos(\omega t + \phi_0)\_\_I$$

$$I_2 \sin(\omega t + \phi_2) = \frac{E_2 R_1}{Z} \sin(\omega t + \phi_0) - \frac{E_1 M \omega}{Z} \cos \omega t\_\_II$$

In the above equations $I_1$ and $I_2$ represent the amplitudes of the currents developed in the circuits, $\alpha_0$ represents the phase difference between the exciting electromotive forces which latter have amplitudes $E_1$ and $E_2$, $R_1$ and $R_2$ correspond to the values of the resistance 14 and 15, and Z is a factor which if the coupling coefficient of the two circuits is represented by $M$ is equal to the following:

$$Z = \left(L_1\omega - \frac{1}{C_1\omega}\right)\left(L_2\omega - \frac{1}{C_2\omega}\right) - R_1 R_2 - M^2 \omega^2$$

As is well known, an electromagnetic wave arriving in the direction shown by the arrow $e$ and forming an angle $\alpha$ with the plane of the loop 11 will cause electromotive forces induced in the loops in accordance with the sine law function as follows:

$$E_2 = H \sin \alpha \_\_\_\_\_\_\_\_\_\_\_\_\_\_\_\_\_\_ III$$
$$E_1 = H \cos \alpha \_\_\_\_\_\_\_\_\_\_\_\_\_\_\_\_\_\_ IV$$

wherein H is equal to the electric field strength of the signal produced at the point of the receiver. Assuming now that $\omega M = R_1 = R_2$ and $\phi_0 = 0$, then by substituting in Equations I and II the values for $E_1$ and $E_2$ according to Equations III and IV, the following new equations are obtained:

$$I_1 \sin(\omega t + \phi_1) = \frac{H}{Z_0} \cos \alpha \sin \omega t - \frac{H}{Z_0} \sin \alpha \cos \omega t =$$

$$+ \frac{H}{Z_0} \sin(\omega t - \alpha) \_\_ V$$

$$I_2 \sin(\omega t + \phi_2) = \frac{H}{Z_0} \sin \alpha \sin \omega t - \frac{H}{Z_0} \cos \alpha \cos \omega t =$$

$$- \frac{H}{Z_0} \cos(\omega t + \alpha) \_\_ VI$$

wherein $$Z_0 = \frac{R_1}{Z} = \frac{R_2}{Z} = \frac{M\omega}{Z}$$

that is, if the ohmic or loss resistances of the circuits 11—12—14—16 and 10—13—15—17 are equal to each other and to the mutual inductance between the circuits due to the inductive coupling between the coils 16 and 17 in the preferred operating adjustment of the system.

Figure 2:
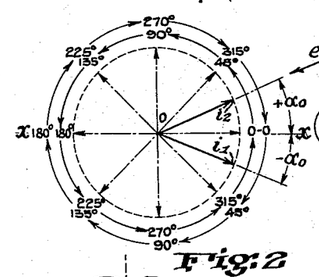
Figure 2 is a diagram explanatory of the function of the circuit according to Figure 1.

From Equations V and VI it is seen that the amplitudes of the currents developed in both loops by an incoming radio signal have been converted into current of substantially the same amplitude independently of the direction of arrival of the signal. Furthermore, the currents in the two circuits are relatively phase shifted; that is, the phase vector of the current in one circuit will rotate in one direction while the phase vector in the other circuit will rotate in the other direction as the difference in amplitude between the impressed electromotive forces increases. As shown in Figure 2, the vector of the current $i_2$ supplied at terminals $c$, $d$ is the mirror image of current vector $i_1$ supplied at terminals $a$, $b$ with respect to an axis X—X. This axis corresponds to the direction $f$ according to Fig. 1 and may be assumed as zero axis in Figure 2. Thus if a signal arrives in the direction $e$ according to Figures 1 and 2, forming an angle $\alpha_0$ with the zero axis $f$ which latter coincides with the bisecting line or 45° angle between the loops, then the current vector $i_2$ shall be shifted by an angle $+\alpha_0$ with respect to zero direction and the current vector $i_1$ shall be shifted by an angle $-\alpha_0$ with respect to the zero direction making the total phase shift between the currents equal to $2\alpha_0$.

The function and operation of the system shown in Figure 1 may also be explained as follows:

The current developed in either of the resonant loop circuits 10, 12, 14, 16 or 11, 13, 15, 17 is equal to the sum of the current derived from one of the loops and the current derived from the other loop through the coupling transformer 16, 17, there being no direct coupling relation between the loops themselves due to their non-coupling position, that is, with their planes forming a right angle in the example illustrated. If both loop circuits are tuned to resonance with the signal frequency, the transformer 16, 17 will cause a quadrature phase shift between the currents in the loop circuit. As a result thereof the loop currents each of which varies according to a figure-of-eight pattern in dependence upon the direction of the signal have to be combined vectorially instead of algebraically as in the case where the currents are combined in phase with each other. If this combination is carried out for different directions and the results plotted in polar coordinates there is obtained a circular directional characteristic; that is, the currents in the two loop circuits are of constant intensity independently of the signal direction but are subjected to a continuous time phase rotation in dependence upon the signal direction as illustrated in Figure 2 of the drawings.

As is well known, the usual figure of eight pattern or directional diagram of a loop or frame aerial may be converted into a cardioid shaped diagram by combining the currents developed in the loop with currents originating from the same signal received by an open or non-directional antenna. Such a cardioid shaped directional diagram as shown at B in Figure 3 while having the advantage of eliminating the 180° sense ambiguity of the figure of eight pattern has the disadvantage that its zero or non-receptive angle is comparatively large (about 90°) thus making it impossible to obtain the directional sensitivity required for reliable direction finding in practice. This difficulty is substantially overcome by combining the currents developed in either of the loop circuits and supplied from the terminals $a$, $b$ or $c$, $d$ according to Figure 1 with a non-directional current derived from an open antenna in which case a modified cardioid shaped diagram hereinafter called "phase cardioid" is obtained as shown at A in Figure 3. In the latter the blind or non-receptive angle $\varphi$ is considerably reduced amounting in practical cases to about 1 to 3 angular degrees. Such a "phase cardioid" accordingly can be advantageously used for direction finding with a sensitivity and accuracy comparable to that of an ordinary loop or equivalent system, such as a Marconi-Adcock aerial system of known construction having a figure of eight pattern diagram without requiring special means and switching operations for sense determination.

Figure 3:
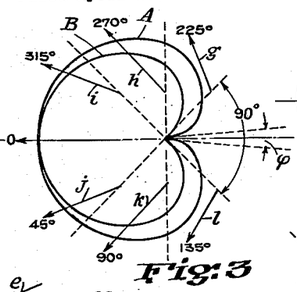
Figure 3 represents a polar directional diagram of an aerial system shown in Figure 1 illustrating the improvement in accordance with the invention.

The vectors $g$, $h$, $i$, $j$, $k$, $l$ in Figure 3 indicate the relative phases for the various angles of the incoming signal. In general, the phases in a "phase cardioid" change from $-90°$ to $+90°$.

Figure 7:
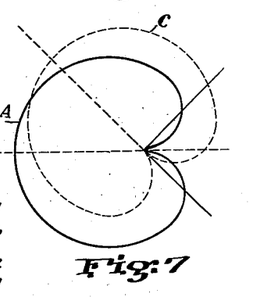
Figure 7 is a further polar diagram explanatory of the function of the invention embodied in an aerial system of the type shown in the previous figures.

As pointed out, the "phase cardioid" as shown in Figure 3 is the result of the combination of either current vector $i_1$ or $i_2$ supplied at terminals $a$, $b$ or $c$, $d$ with a current of constant or invariant phase such as obtained from an open or non-directional antenna. If the vectors $i_1$ (supplied at terminals $a$, $b$) or $i_2$ (supplied at terminals $c$, $d$) are combined with a current vector of constant phase such as obtained by an open antenna, substantially the same "phase cardioid" diagrams will be obtained which are however displaced relatively as shown at A and C in Figure 7.

Figure 4:
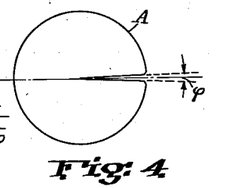
Figure 4 shows a similar improved polar diagram obtainable in accordance with the invention.

It is possible to further reduce the zero or non-receptive angle of a "phase cardioid" of the type described by the use of a receiver or amplifier with a non-linear input-output characteristic or by the employment of a current limiting device of any known type such as a saturated discharge tube adapted to cut off excess signalling current above a predetermined value. In this manner it is possible to secure a diagram of substantially circular shape with a zero or non-receptive angle $\phi$ as low as one angular degree and less as illustrated in Figure 4.

It can be shown that if the constants of the circuits are not exactly alike that the above conditions will not be seriously affected and that sufficiently correct bearings are obtainable when using the usual methods and circuit designs. Thus, if the non-reactive impedances $R_1$ and $R_2$ of the circuits are not exactly equal to one another and to the mutual coupling impedance $\omega M$, or if the circuits are slightly detuned relative to each other, the circular shaped phase diagram according to Figure 4 will change into an ellipse. If both circuits are detuned by the same amount relative to the signal frequency, or in other words, if $L_1=L_2$, $C_1=C_2$ and $R_1=R_2=\omega M$, the phase diagram will still retain its original or circular shape.

Figure 5:
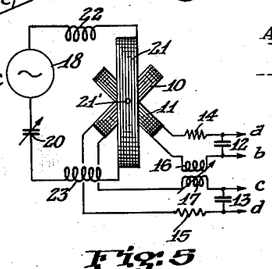
Figure 5 shows a phaseometer or phase control device adapted for the purpose of the invention.

From the foregoing, it will be understood that the system of the character described may be employed as a phase splitting or control device to obtain a current having a desired time phase relation in a direction finding or any other system. Thus, as shown in Figure 5 if the two loops or coils 10 and 11 are coupled loosely with a third circuit comprising a source of oscillations 18, a tuning condenser 20, inductance coils 22 and 23 and a coupling coil 21, current components of any desired phase relationship may be obtained from the output terminals $a$, $b$ or $c$, $d$ of the two loop or coil circuits by displacing the loops or coils 10 and 11 relative to the coil 21 thereby varying the amplitudes of the currents induced in the loops on account of the variation of the flux linkage therebetween and the coil 21. Such a phaseometer arrangement has great advantage over devices serving a similar purpose by enabling the attainment of currents of a substantial constant amplitude but varying phase relation. As is understood, a device of this type has many uses for measuring and other purposes. Alternatively, a current with a continuously and periodically varying phase or rotating phase vector may be obtained in an easy manner by continuously rotating either the coil 21 or the crossed coils 10 and 11 about their axis 21' by mounting same upon the shaft of a motor.

A current with a rotating phase vector may also be secured purely electrically, that is without any mechanically moving parts by impressing upon the twin circuits (10, 13, 15, 17 and 11, 12, 14, 16 according to Figure 5) current components of equal frequency modulated in accordance with current components of the same but lower frequency which are in quadrature phase relation, whereby the differential between the amplitudes of the impressed currents increases and decreases gradually and periodically, preferably according to a sinusoidal function, thereby causing a corresponding phase rotation of the currents obtained from either output terminals $a$, $b$ or $c$, $d$. A system of this type will be described in more detail in connection with Figure 10.

Figure 6:
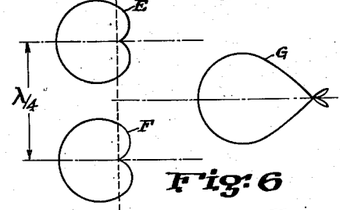
Figure 6 illustrates an improved polar diagram obtainable by the employment of the invention in connection with a spaced directional aerial system.

A "phase cardioid" of the type described hereinabove may be further employed in connection with directional systems of the type comprising a plurality of spaced antenna elements known as a directive beam system and used primarily for directive reception of wireless signals. As is well known, by a system of this type comprising a plurality of antenna elements each of which has a cardioid shape diagram obtained by the combination of a loop and open antenna and spaced from each other by distances of one-half wave length an improved directional characteristic is obtained with respect to the resultant current obtained by combination of all the currents received by the separate directional antenna elements. In a system of this type, zero signal reception takes place at angles of ±90° with respect to the maximum signal direction which latter is at right angles to the line connecting the antenna elements. When using antenna elements each of which has a "phase cardioid" characteristic of the type obtained by an arrangement according to Figure 1 in combination with an open antenna, the antenna elements may be spaced at distances of only one-quarter wave length and will still furnish an improved directional characteristic with zero reception at angles of ±90°. This is illustrated in Figure 6 wherein E and F represent the diagrams of two antenna elements spaced at one-quarter wave length and G represents the resultant characteristic of a current obtained in a common receiving circuit by combination of the currents received by the separate antennae. In order to obtain this improved characteristic, it is further necessary that the cardioid E should be derived from the current developed in one of the twin circuits according to Figure 1 such as obtained at terminals $a$ and $b$ and that the cardioid F should be derived from the current developed in the other twin circuit such as obtained at terminals $c$ and $d$. Or, in other words, the diagrams should be oriented as shown at A and C in Figure 7.

The reduction in spacing between the antenna elements involves a substantial saving and simplification compared with other known means for obtaining a similar directional effect such as the use of non-linear amplification or input-output relationship in the associated receivers. In other words, the invention as described makes possible the reduction of spacing by artificially modifying the phase difference between the current components developed in the different antenna elements by virtue of the spacing therebetween responsible for the directional effect in the common receiver. In general a system of "$n$" antennae each having a "phase cardioid" diagram of the type according to the invention will produce substantially the same directional characteristic with only one-half the spacing distance between the antennae or one-half of the total length of the antenna array required for obtaining a characteristic of a given shape or directional sensitivity by arrangements known in the prior art.

Figure 8:
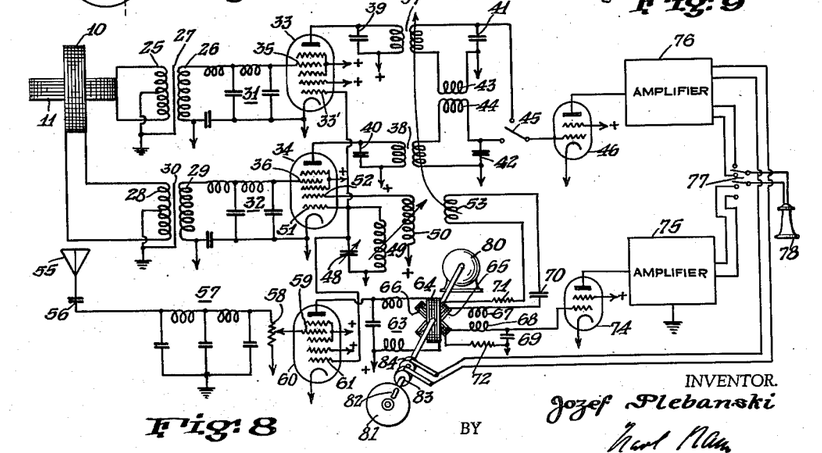
Figure 8 is a circuit diagram showing a complete direct reading wireless direction finder or radio compass constructed in accordance with the invention.

In Figure 8 there is shown a complete system and circuit diagram of a wireless direction finder or radio compass embodying the novel improvements of the invention. The circuit shown is of the superheterodyne type whereby the phase control circuits embodied in the intermediate frequency section of the receivers may be fixedly adjusted in advance, thus eliminating the problems of tracking and ganging for tuning the system to signals of different wave length. The high frequency input circuits are shown to be of the aperiodic type and include suitable filters for image frequency suppression to further simplify the circuit and operation.

It is understood, however, that tuned input circuits with ganged condensers and tracked circuits of known design may be employed without departing from the spirit of the invention.

Referring to Figure 8, items 10 and 11 represent a pair of crossed loop or frame aerials similar as shown in Figure 1. The loop 10 connected with an input transformer having a primary 28 and a secondary 29, the former being center-tapped and grounded together with a shield 30 arranged intermediate the primary and secondary windings. The latter arrangement serves for the well known purpose of eliminating the so-called "open antenna effect" of the loop. Similarly, the loop 11 is connected to an input transformer having a primary 25, secondary 26 and a shield 27, the latter being grounded together with the center of the primary 25. The secondaries 26 and 29 of the input transformers are connected to filters 31 and 32 respectively. The output terminals of the filters are connected to the control grids 35 and 36 and the cathodes of the modulating or electron mixer tubes 33 and 34, respectively, each of which comprises in the known manner a cathode, a first or oscillating grid (33' and 51), a positive or anode grid, a control grid (35 and 36) surrounded by a shield grid and an anode.

In a similar manner the signals received from the same transmitting source by an open antenna 55 are applied to an input filter 57 through a coupling condenser 56. The output of the filter is connected to a potentiometer 58 having a tap connected to the control grid 59 of a mixer tube 60 of similar construction to the tubes 33 and 34. The oscillating grids 33', 51 and 61 of the tubes 33, 34 and 60 are connected to a common local oscillating circuit comprising a variable condenser 48 and an inductance coil 49 in parallel. In order to maintain sustained local oscillations of a frequency equal to the resonant frequency of the circuit 48, 49 a feedback or tickler coil 50 is inserted in the lead from the anode grid 52 of the tube 34 to the source of positive potential indicated by the + sign.

By the action of the tubes 33, 34 and 60 incoming signals are combined with local signals of different frequency produced in the oscillator circuit 48, 49 by the modulating action of the tubes, whereby currents of an intermediate frequency equal to the difference between the receiving frequency and the frequency of the local oscillations are generated in the output or anode circuits of the tubes. The intermediate frequency current produced by the tube 33 is segregated or filtered out by means of a tuned transformer 37 having its primary and secondary shunted by tuning condensers 39 and 41 respectively and including a coupling coil 43. Similarly, the intermediate frequency current produced by tube 34 is filtered out by means of a tuned transformer 38 having its primary connected in the anode circuit of the tube and shunted by the tuning condenser 40 and having a secondary shunted by a tuning condenser 42 and including a coupling coil 44. The coils 43 and 44 are arranged in inductive relation to produce currents of varying phase relation in proportion to the direction of arrival of a radio signal in the twin circuits 37, 41, 43 and 38, 42, 44 similarly as described in connection with Figure 1. Both twin circuits are arranged to be alternately connected through a switch 45 to the grid of an amplifying tube 46 which may be followed by further stages of amplification indicated schematically by the amplifier 76. The output circuit of the amplifier 76 is shown connected to a telephone or any other suitable indicator or translating device 78 by means of a switch 77. The intermediate frequency current produced by the mixer tube 60 associated with the receiving circuit connected with the open antenna is segregated by means of a filter 63. The output terminals of the latter are connected to a stationary inductance coil 64 of a phaseometer device of the type as described in Figure 5 further comprising a pair of crossed coils 65 and 66 arranged coaxially with the coil 64 and mounted upon a rotating shaft which may be operated either manually or automatically.

Coil 66 forms a tuned circuit together with condenser 69 and coupling coil 68. This circuit is connected to the grid of an amplifier tube 74 followed by further stages of amplification indicated at 75. The output circuit of the amplifier 75 may be connected to the indicator 78 in the lower position of the switch 77. Coil 65 of the phaseometer forms a tuned circuit together with condenser 70 and a pair of coupling coils 53 and 67. The coils 67 and 68 are arranged in inductive relation for phase control in a manner similar to that described by Figures 1 and 5. Items 71 and 72 represent the non-reactive impedances of the phasing circuits designed to be of substantially equal value. Coil 53 is inductively coupled with either or both of the output twin circuits of the tubes 33 and 34. There is furthermore provided a disc 81 arranged upon the shaft of the crossed coils 65 and 66 and carrying a current indicator such as a neon tube 82. The neon tube is arranged to be energized from the output of the amplifier 76 through a pair of slip rings 83 and 84 with brushes connected to the output leads of the amplifier sliding thereon.

The operation of the system as described is as follows. A radio signal arriving in a predetermined direction induces currents in the loops 10 and 11 which are converted into a current of substantially fixed phase relation or currents with a stationary phase vector serving to control the input of the amplifier 46 in either position of the switch 45. To this current is added through the coupling coil 53 a current of gradually and periodically varying phase or rotating phase vector derived from the open antenna and produced by means of the phaseometer system according to the invention. Thus, by rotating the disc 81, the phase of the current in the twin circuit including the coupling coil 53 is varied gradually or the phase vector rotated in such a manner that at a definite position of the disc 81, the current components supplied by the loop antenna and the open antenna and combined in either of the twin circuits 37, 41, 43 or 38, 42, 44 dependent on the position of the switch 45 will either add or oppose thereby affecting the indicator 82. In the case of a neon tube, the tube will light up as long as the currents add, but will extinguish when the phases of the currents are opposite provided the currents are of equal amplitude. The latter condition is obtained by adjusting the input potentiometer 58. By means of a scale calibrated in directions cooperating with the disc 81 such as shown more clearly in Figure 9, a direct indication of the direction of arrival of a radio wave is thus affected in a simple and efficient manner.

If a continuous indication without manual operation is desired, a motor 80 arranged to drive the shaft of the crossed coils 65 and 66 is started in which case a current component with a continuously rotating phase vector is impressed upon either of the twin circuits 37, 41, 43 or 38, 44, 42 and combined with the current of substantially fixed phase relation derived from the loop signals. As long as the currents are in adding relation, the neon tube will light up giving the appearance of a luminous circle provided the motor 80 rotates at a sufficiently high speed as shown at 87 while during the moment when the currents are of opposite phase, the lamp will be extinguished momentarily showing a dark line or spot as illustrated at 88 in Figure 9. The position of the latter corresponds to the direction of the radio signal source and may be directly read without requiring any manual operation and adjustments on the part of the operator.

The system may further be used for aural direction finding by placing the switch 77 in the upper position and rotating the disc 81 manually until the signal strength in the indicator 78 decreases to a minimum in which latter case the motor 80 may be disconnected automatically by the operation of the switch 77. If the system is used for automatic indication in the lower position of switch 77, the receiver 78 is connected to the non-directional antenna 55 and may serve for ordinary communication purposes and for identification of the transmitting station being received.

If an arrangement of the above described type is used on a movable craft such as a ship or aircraft traveling in a definite direction whereby a transmitter produces a definite bearing upon the scale 81, the direction indication will deviate to the left by switching from one twin circuit to the other by operating switch 45. If the deviation is towards the right of the course, the indication will shift in the other direction. If the craft is maintaining its prearranged course, then the bearing indication will remain constant, that is will shift neither towards the right nor left if switch 45 is moved from one to the other position. The same checking operation may be carried out orally by means of the head phone 78 or the like as will be understood by referring to Figure 7. The latter, as explained hereinbefore, represents the cardioid diagrams for the two loops 10 and 11 corresponding to the two positions of the switch 45. As is seen, the deviations to the left will make the signals stronger in one position of the switch while the deviation to the right will make the signal weaker in the same position of the switch.

As is understood, any other type of indicator may be provided in place of the neon tube shown for illustration.

As previously described, the system illustrated has the advantage that ganging and tracking problems of the separate circuits are substantially eliminated. It will be understood however that ganged tuned circuits may be provided and that a straight high frequency system may be employed in place of a superheterodyne system illustrated. In the latter case, it will be necessary to provide means to ensure the correct relation or equality between $\omega M$ and $R_1$ and $R_2$ while tuning from one wave length to another. This can easily be obtained automatically by using variable resistors of suitable design mechanically coupled with the condenser control mechanism. As pointed out, the ratio of the signal amplitude of the open antenna relative to the signals received by the loops should have a proper value. For this purpose, the input potentiometer 58 has been provided which may be connected mechanically with a gang condenser of the receiver or the oscillator condenser 48.

It will be understood from the above that the invention is not limited to aerials of the type illustrated, and equally applies to aerials of equivalent construction such as aerials of the Marconi- Adcock type or the like. Furthermore, the invention may be provided in systems comprising goniometer arrangements connected with fixed aerials of either the loop or Marconi-Adcock type in a known manner.

It will be further apparent that the loop aerials as shown in Figure 8 may be directly rotated by means of a motor in which case the phasing goniometer associated with the open antenna may be dispensed with. In either case, a signal current component having a rotating phase vector is combined with a current component having a substantially fixed phase vector dependent on the direction of arrival of a radio signal and the combined current is utilized to affect an indicating device at a definite relative time phase position between the two phase vectors to affect an indication of the direction of the radio signal on an indicating scale.

Referring to Figure 10, there is shown a direction finding system similar to Figure 8 in general design with a cathode ray device as a directional indicator adapted for operation without the use of any mechanically moving elements. The system comprises substantially the same basic elements as the system according to Figure 8, viz., a pair of loop aerials and an open aerial each of which has a radio receiver or channel preferably of the superheterodyne type associated therewith.

Figure 9:
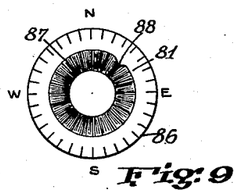
Figure 9 is a partial detail view of the indicator shown in Figure 8.

The signal current components received by the loops are transformed into a current of substantially constant phase or with a substantially stationary phase vector varying only in accordance with the direction of arrival of the signal while the current received by the open antenna is utilized to produce a periodically rotating phase vector. The currents derived from the loop aerials and from the open antenna are combined to produce a resultant current or potential serving for controlling the grid or equivalent control element of a cathode ray tube. In the latter, the electron beam produced in a known manner is caused to rotate along a circular trace synchronously with the rotation of the phase vector derived from the open antenna whereby in a manner similar to the operation and function of the neon tube arrangement shown in Figure 8 the cathode ray will produce a continuous luminous circle which is interrupted at a definite point corresponding to the position of the phase vector obtained from the loop aerial receiver or in other words, dependent on the direction of arrival of the radio signal received by the system. In this manner it is possible to directly indicate the direction of a transmitting station on a scale similar as shown by Figure 9.

Referring more particularly to the arrangement of Figure 10, the coaxial crossed loop aerials are shown at 90 and 91. Aerial 90 is connected to an input transformer having a primary 92 and a secondary 93 and aerial 91 is connected to a similar transformer having a primary 95 and a secondary 96. The center points of the primaries 92 and 95 are grounded together with metal shields 94 and 97 arranged between the primary and secondary windings for the purpose of eliminating the "open antenna effect" in a manner well known in the art. The secondary 93 is shunted by a pair of branch circuits one of which comprises a non-reactive impedance such as a resistor 98 in series with a condenser 99, the other branch circuit comprising a condenser 100 in series with non-reactive impedance 101. Similarly, the secondary 96 is shunted by a pair of branch circuits the first of which is comprised of a non-reactive impedance 102 in series with a condenser 103, the second branch circuit comprising a condenser 104 in series with a non-reactive impedance 105. The junction points between condenser 100 and impedance 101, and between condenser 104 and impedance 105 are connected to the control grids 108 and 109, respectively, of a pair of modulating or electronic mixer tubes 106 and 107 similar to those described in connection with Figure 8. Similarly the junction points between the impedance 98 and condenser 99 and between the impedance 102 and condenser 103 are connected to the control or input grids 143 and 155, respectively, of a further pair of electronic mixer tubes 148 and 149. In this manner controlling potentials having a quadrature phase relation are applied to the control grids of the two mixer tubes associated with each of the secondaries of the input transformers. The purpose of this arrangement in conjunction with a similar arrangement for effecting control of the oscillating grids of the mixer tubes by potentials having a quadrature phase relation, is to provide a means for automatic suppression of the image frequency in the superheterodyne receivers in place of the input filter devices as provided in the system according to Figure 8.

The open antenna 113 is connected in a similar manner through a coupling condenser 114 to a pair of parallel branches one of which comprises a non-reactive impedance 115 in series with a condenser 116, the other branch comprising a condenser 118 in series with a non-reactive impedance 117. The junction between the condenser 118 and impedance 117 is connected to the grid 120 of a mixer tube 119 and the junction between the impedance 115 and the condenser 116 is connected to the grid 160 of an associate mixer tube 156 in a manner similar to the connection of the mixer tubes associated with the loop aerials. The oscillator grids 123, 124 and 125 of the mixers 106, 107 and 119 are provided with grid leak resistances 126, 127 and 128, respectively, and are connected through coupling condensers 129, 130 and 131 to a common oscillating tank circuit formed by an inductance coil 134 which may be shunted either by a tuning condenser 135 in series with a non-reactive impedance 136 or by a tuning condenser 137 in series with a non-reactive impedance 138, by means of a switch 139.

In order to maintain sustained oscillations in the oscillating tank circuit there is provided a feedback or tickler coil 144 connected in the lead from the anode grid 141 of the mixer 106 to the positive pole of a high tension source indicated by the + sign. The grids 147, 152 and 159 of the mixers 148, 149 and 156 are provided with grid leak resistances 146, 151 and 158, respectively, and are all connected through coupling condensers 145, 150 and 157 to the junction between condenser 135 and impedance 136 or between condenser 137 and impedance 138 of the oscillating circuit dependent on the position of the switch 140 which is preferably mechanically connected and operated simultaneously with the switch 139. The tuning condenser 135 and associated series impedance 136 and the tuning condenser 137 and associated series impedance 138 are preferably connected mechanically by a suitable coupling device in such a manner as to maintain a desired relationship between the circuit constants as described hereinbefore. By an arrangement of this character which is described in more detail in my patent entitled Radio circuits No. 2,135,051, issued November 1, 1938, intermediate frequency currents are obtained in the combined output or anode circuit of the corresponding mixer tubes with substantial elimination of the image frequency over substantially the entire tuning range of the receiver.

The intermediate frequency current derived from the loop 91 is segregated or filtered out by means of a tuned transformer having a primary 169 inserted in the common anode circuit of the tubes 107 and 149 and shunted by tuning condenser 168. The secondary 170 of the transformer is shunted by a tuning condenser 171 in series with a coupling coil 173. Similarly the intermediate frequency current derived from the loop 90 is segregated or filtered out by means of a tuned transformer having a primary 164 shunted by a tuning condenser 163 connected in the common output or anode circuit of the tubes 106 and 148. The secondary 165 is shunted by a condenser 167 in series with a coupling coil 172. The coupling coil 172 is arranged in inductive relation with the coupling coil 173 of the intermediate frequency output circuit associated with the loop 91. In this manner the intermediate frequency currents in the circuit 165, 167, 172 have a phase relation determined by the direction of arrival of an incoming signal received by the loops. This current is then impressed upon an amplifier 180 and a portion of the output of this amplifier which may contain a suitable demodulating device is applied through a coupling condenser 182 to a further amplifier 183 which latter serves to energize a suitable receiving or translating device such as a telephone or loud speaker shown at 184.

Another component of the current supplied by the amplifier 180 which as pointed out has a fixed phase vector determined by the direction of the signal is combined with a component having a continuously rotating phase vector derived from the open antenna 113 and the resultant current is rectified by the rectifier 255 to produce a biasing potential impressed upon the control element of a cathode ray device 189 to obtain a visual indication of the direction in a manner to be described in greater detail hereafter.

There follows now a description of the arrangement for producing an intermediate frequency current with a continuously rotating time phase vector derived from the open antenna 113. The intermediate frequency current produced by the mixers 119 and 156 is segregated by means of a tuned transformer having a primary 175 shunted by a tuning condenser 174 and connected in the common anode circuit of the tubes. The secondary 176 is shunted by a condenser 177 and in this manner an intermediate frequency current is obtained and impressed upon an amplifier 181. The amplified current is then divided or split into two components in phase quadrature with each other, each of which components is modulated by a corresponding component of a pair of modulating currents of substantially lower frequency also having a quadrature time phase relationship.

In this manner two modulated intermediate frequency currents are obtained with modulating components or envelopes in phase quadrature or in other words, the amplitude of one component will gradually and periodically increase while the amplitude of the other component decreases. These components are then combined in a phaseometer arrangement of the type described resulting in a current with a continuously rotating phase vector in a manner well understood from the above.

In the example illustrated, the output terminals of the amplifier 181 are connected to a tuned circuit comprising an inductance coil 220 shunted by a condenser 221 in series with a non-reactive impedance such as an ohmic resistor 222. An amplifying tube 223 has its grid controlled by a potential derived from the upper terminal of the tuned circuit while the grid of a further amplifying tube 224 is connected to the junction between the condenser 221 and impedance 222 of the tuned circuit. In this manner the control potentials impressed upon the grids 223 and 224 are in phase quadrature thereby causing quadrature currents in the output circuits of the tubes which includes tuned circuits comprising inductance coils 227 and 229 shunted by condensers 228 and 230, respectively, connected to the anodes of the tubes through coupling condensers 225 and 226. In this manner quadrature currents of intermediate frequency are set up in the tuned circuits 227, 228 and 229, 230.

These currents are modulated by corresponding quadrature components of a modulating current of a lower frequency generated by a local oscillator. The latter comprises an oscillating tube 195 having a grid tank circuit comprised of an inductance coil 197 shunted by a condenser 201 in series with a non-reactive impedance 202. The grid circuit is connected to the grid of the oscillator through a coupling condenser 198 and which is also provided with a grid leak resistance 199. The oscillations are maintained by the aid of a feedback coil 196 arranged in inductive relation with the coil 197 of the grid tank circuit and connected to the anode of the tube through condenser 200. The coils 196 and 197 may be arranged upon an iron core as indicated. The junction between the condenser 201 and impedance 202 of the tank circuit is connected through a coupling condenser 203 to the control grid of an amplifier 205 which is also provided with a grid leak resistance 204. In this manner the grids of the tubes 195 and 205 are excited by potentials in phase quadrature and corresponding amplified currents are set up in the anode circuits of the tubes. The former includes an inductance coil 206 grounded by a condenser 207, the primary 215 of a first transformer to be described presently and the primary 216 of a second transformer and a condenser 217. The anode circuit of the tube 205 includes an inductance coil 208 grounded by a condenser 209, the primary 210 of a first transformer and the primary 211 of a further transformer in series with a condenser 219. The secondaries 218 and 213 of the primaries 216 and 211 are connected to the opposite plates of a pair of deflecting plates 190 and 191 of the cathode ray tube 189 arranged with their axes at right angles in a known manner. The center points of the secondaries 213 and 218 are shown connected to ground. In this manner potentials in phase quadrature varying at a frequency determined by the constants of the oscillating tank circuit 197, 201, 202 are applied to the deflecting system of the cathode ray tube whereby the luminous spot produced by the cathode ray on the fluorescent screen 192 will describe a circle in a manner well known as indicated by the dotted line 193'.

Returning to the primaries 210 and 215 connected in the anode circuits of tubes 205 and 195, these serve to apply quadrature currents of low frequency to their associated secondaries comprising winding portions 231 and 233 connected through a non-reactive impedance 232 (for the primary 210), and winding portions 238 and 240 connected through a non-reactive impedance 239 (for the primary 215). The impedances 232 and 239 are provided with a center tap connected to the upper terminal of the resonant circuits 227, 228 and 229, 230 respectively which latter carry quadrature currents of intermediate signal frequency as described. The secondary windings of the transformers 210, 215 are further connected through a pair of rectifiers 234, 235 and 241, 242 to tuned circuits comprising condensers 236 and 243, respectively, shunted by inductance coils 244, 245, 248, and 246, 247, 249, respectively. In this manner as will be understood, the quadrature currents of intermediate signalling frequency supplied from the circuits 227, 228 and 229, 230 are modulated by the corresponding quadrature components of the current produced by the local oscillator 195 through the action of the rectifiers thereby producing a pair of modulated current components having amplitudes varying according to a lower frequency in phase quadrature relation.

The latter are combined in a twin circuit arrangement of the type according to the invention through the coupling coils 248 and 249 similarly as described in the previous figures in such a manner that components of gradually and periodically varying phase or with a rotating phase vector are obtained in the circuits one of which components serves to control the grid of a further amplifier 250 which is in turn coupled with the input circuit of rectifier 255 in the output of the loop receiver described previously through a coupling condenser 251 and either of a pair of variable impedances 252a or 252b and a coupling coil 253 in inductive relation with the input inductance 187 of the rectifier tube 255. Switch 254 is mechanically connected with switches 139 and 140 for the purpose as will be described later.

In this manner, a component with a continuously rotating phase vector is combined with the component of a substantially constant phase determined by the direction of the signal received and serves to produce a biasing potential in the rectifying circuit which is impressed upon the cathode of the cathode ray tube 189, the grid of which in the example illustrated is normally grounded.

For the latter purpose, the input circuit 186, 187 for the diode-triode 255 is connected to the auxiliary anode 257 and to the cathode of the latter in series with an ohmic resistance 258 shunted by a condenser 259. In this manner the high-frequency currents impressed upon the diode section of the tube 255 are rectified and a direct potential drop is produced across the resistance 258 varying in proportion to the amplitude of the impressed signalling current. This potential drop is impressed upon the control grid 256 of the tube 255 through a direct connection from the junction between the inductance 187 and the resistance 258 leading to the grid as shown. As a result, an amplified potential drop is produced across the output resistance 260 inserted in the cathode lead of the tube 255. The latter potential drop serves to control the grid 188 of the cathode ray tube 189 through a direct connection of the cathode of tube 255 with the cathode of the cathode ray tube and connection of the grid of the cathode ray tube to ground through the upper contact of a switch 263 normally in closed position. Thus, if intermediate frequency potentials are impressed upon the diode section of tube 255, a corresponding direct voltage is set-up across the resistance 258 thereby making the grid 256 more negative and causing a decrease of the anode current through the tube. As a result, the cathodes of tube 255 and of the cathode ray tube will assume a definite positive potential which is identical to a corresponding negative potential on the grid 188 of the cathode ray tube. Conditions are chosen in such a manner that with the signal from the open antenna being absent the negative bias on the grid of the cathode ray tube is such as to produce a luminous spot on the screen moving in a circular direction in the manner described hereinbefore. If then the signal component with a rotary phase vector derived from the open antenna is impressed upon the input circuit 186, 187 through the coupling coil 253 it is seen that at one relative time-phase position the two currents will oppose each other, thereby eliminating the negative bias on the grid 256 of the diode-triode 255 causing in turn a potential rise at the cathode of the tube 255 and of the cathode ray tube or in other words, a high negative potential impressed upon the grid 188 of the cathode ray tube. As a result, the cathode ray will be suppressed during this instant and the luminescent spot disappear, leaving an interruption in the luminous circle which may serve to indicate the direction of the signal on a cooperating scale in a manner described hereinbefore.

There is further shown an arrangement for eliminating bearing errors caused by the so-called "night effect" experienced in radio direction finding with short electric waves.

As is well known, if a short wave signal is transmitted, it is usually received in the form of successive impulses, the first of which originates from the so-called ground wave traveling along the earth's surface from the transmitting to the receiving station, while the following impulses arriving in successive intervals are due to the so-called sky wave component of the signal reaching the receiving station through different paths and in different directions and with varying polarization after one or more reflections from the ionized or Heavyside layer in the upper region of the earth's atmosphere.

In order to eliminate the errors due to the reflected or sky wave components of a radio signal, there is provided in accordance with the invention, an arrangement comprising an amplifier 262 which includes a suitable delay network. The input of the amplifier is controlled by the incoming signals and in the example shown is directly connected to the tuned input circuit 186, 187 of the diode-triode 255 through a switch 261. The output of the amplifier or delay network 262 serves to operate the relay or switch 263 which is normally in the upper position thereby grounding the grid 188 of the cathode ray tube as described above. Thus, if a signal arrives its effect on the grid of the cathode ray tube will be limited to a short period such as a few milliseconds, or less, whereupon the switch or relay 262 is moved into its lower position, thereby applying a high negative potential supplied by a battery 264 to the grid of the cathode ray tube and completely suppressing the electron ray and rotating luminous spot on the screen of the cathode ray tube. As is obvious, a system of this type is especially suited for telegraphic or code signals consisting of interruptions of a carrier wave. In detail the operation of the "night effect" eliminator as described is as follows:

At the instant a telegraph signal such as a dash or dot according to the well known Morse system arrives, the luminous circle on the screen of the cathode ray tube will show an interruption or dark spot for a short interval thereby indicating the true bearing of the transmitting station in a manner described hereinbefore. This interval corresponds to the time necessary for the signal to pass through the amplifier and the delay network 262 whereupon the switch or relay 263 is moved from the upper to the lower position and a heavy negative grid bias applied to the grid of the cathode ray tube by the battery 264. The cathode ray is interrupted and the spot on the screen disappears. The switch 263 will remain closed until the end of the dash or dot, thereby eliminating any indication of signals originating from the sky wave component arriving subsequently to the initial or ground wave signal. After the signal has ceased; that is, at the beginning of the spacing period, the switch 263 is again automatically moved to its normal position, thereby restoring the original condition for true bearing indication at the beginning of the next dot or dash of the signal. If the system is used for long wave direction finding, the night error eliminator may be disconnected by opening the switch 261.

The provision of the double tuning condensers 135 and 137 with individual series impedances 136 and 138, in the oscillator circuit and ganged switches 139, 140, and 254 previously described, serves the purpose of pre-tuning the receiver to two different wave lengths or transmitting stations having different geographical locations to effect a direct position indication on a moving vessel or aircraft as illustrated in more detail in Figure 11. In the latter, the two transmitting stations are indicated at M and N on a transparent map 265. The ganged switch 139, 140, and 254 is periodically moved from one to the other position such as once every one-quarter of a second by using a rotary switch or the like of known construction driven by a motor. In this manner the system is alternately receptive to either of the two transmitting stations M and N whereby two directional indications are produced on the screen of the cathode ray tube in the form of dark spots or interruptions of the luminous circle in the manner described hereinabove.

The transparent map 265 is arranged in front of the screen of the cathode ray tube and shows the terrain over which an aircraft is flying. The map is arranged so that it can be moved in both vertical and horizontal directions by any suitable means such as a wire pulley arrangement as indicated by the arrows in the drawings. Items 266 and 267 are a pair of thin rods pivotally mounted at the center 269' of the cathode ray tube. These rods are further arranged in a slidable and rotatable manner about points coinciding with the location of the transmitting stations M and N, respectively. For the latter purpose, rotatable members such as rivets 268 and 269 are arranged at the points M and N and provided with perforations through which the rods may slide freely when the map is moved either in a horizontal or vertical direction. In order to determine the position of an aircraft or other moving vehicle equipped with a position indicator of this type, all that is necessary for the operator is to move the map in both directions until the rods 266 and 267 coincide with the dark spots of the luminous circle produced on the screen of the cathode ray tube in which case the point on the map overlying the center 269' of the cathode ray screen will indicate the true geographical position of the craft. The latter is true if the craft, in the example shown, moves from south to north and if the loops 270 are positioned as indicated in Figure 13, that is, with their bisecting line coinciding with the keel line of the craft. If the aircraft or other vehicle is not heading in a true north-south direction, all that is necessary is to determine the deviation from the north-south line with the aid of an ordinary compass and to rotate the cathode ray tube by this same angle. By an arrangement of this type, a pilot may determine his position at any time in a most easy and simple manner. As is obvious, a specially prepared map has to be provided for each desired flight or course. Instead of utilizing two transmitting stations, the arrangement may be modified for simultaneous reception of three or more stations by the provision of a corresponding number of pre-tuned circuits associated with the heterodyne oscillator in a manner similar as described.

As is understood, the aperiodic input system described for illustration and disclosed in more detail in the above mentioned copending application, greatly simplifies the entire receiving system by limiting the tuning adjustments to the operation of the oscillating condensers 135 or 137. If the range of wavelength for which the system is designed is narrow, the adjustment of the resistances 136, 138, 252a and 252b may be dispensed with without affecting the accuracy and correctness of the bearing indication. Furthermore, when using an aperiodic system of the type described, a detuning of the oscillating circuit will not affect the bearings by reason of the fact that a signal in the three channels associated with the two loop aerials and the open antenna will be dephased by substantially the same amount.

In an arrangement above described, the rotating spot will appear only when the signal is present whereby the bearing indication corresponds to the disappearance of the spot or interruption of the luminous circle. As is obvious, the arrangement may be reversed in such a manner that the signal will normally extinguish the spot and that the bearing will be indicated by the appearance of the spot on the screen. This latter condition can be obtained in an easy manner by reversing the bias on the cathode ray tube; that is, by decreasing the negative grid bias by an increase of the signal.

Instead of the delay network or amplifier 262, an automatic volume control system of known design may be provided, designed with a definite time delay action.

The bias or control grid of the cathode ray tube is preferably adjusted in such a manner that when a signal arrives, the current of the tube assumes immediately its saturation value and that when the signal disappears the potential drops below the cut-off point of the tube characteristic. In the latter case, the direction indication is marked by a very dark gap comprising only a few angular degrees in the luminous circle produced by the rotary cathode ray.

The quadrature deflecting potentials impressed upon the deflecting plates of the cathode ray indicator are preferably of sinusoidal shape to prevent distortions of the luminous circle. For the latter purpose the primaries 211 and 216 of the transformers supplying the deflecting potentials are tuned to the frequency of the latter to eliminate the effect of harmonics and other disturbing frequencies. The primary 211, primary 210, condenser 209 are combined in series and tuned by condenser 219 and the primary 216, primary 215 and condenser 207 combined in series are tuned by condenser 217. The two loop aerials 90 and 91 should be exactly balanced to equal gain so that the intermediate signals are alike. The balancing may be effected by adjusting the resistances 102 and 105 relative to the resistances 98 and 101 or by providing an additional balancing resistance in the loop circuits.

It will be obvious from the above that the invention is not limited to the specific arrangement of parts and elements shown and disclosed for illustration, but that the underlying novel thought of the invention is susceptible of numerous modifications and variations differing from the embodiments described herein and coming within the broader scope and spirit of the invention as defined in the appended claims. The specification and drawings are accordingly intended to be regarded in an illustrative rather than in a limiting sense.

I claim:

1. In a directive radio system, a pair of frame aerials arranged at a right angle relative to each other, resonant circuits connected to each of said aerials tuned to the frequency of an incoming radio signal, a coupling element interconnecting said circuits, the non-reactive impedances of said circuits being equal to each other and to the mutual coupling impedance of said coupling element, whereby currents having a definite phase relation depending upon the direction of arrival of the incoming signal are set up in said resonant circuits, and means for utilizing the current in at least one of said circuits for determining the direction of arrival of said radio signal.

2. In a directive radio system, a pair of frame aerials arranged at a right angle relative to each other, resonant circuits connected to each of said aerials tuned to the frequency of an incoming radio signal, a coupling element connecting said circuits, the non-reactive impedances of said circuits being equal to each other and to the mutual coupling impedance of said element, whereby currents having a definite phase relation depending on the direction of arrival of said radio signal are set up in said circuits, a non-directional aerial, and means for combining the currents set up in at least one of said resonant circuits with a current derived from the same radio signal received by said non-directional aerial to determine the direction of arrival of said radio signal.

3. In a directive radio system, a pair of frame aerials arranged at a right angle relative to each other, resonant circuits connected to each of said aerials tuned to the frequency of an incoming radio signal, a coupling element interconnecting said circuits, the non-reactive impedances of said circuits being equal to each other and to the mutual coupling impedance of said element, whereby a current having a definite position of its phase vector is set up in each of said circuits depending on the direction of arrival of said signals, means for producing a further current from the same radio signal having a continuously rotating phase vector, means for combining the last mentioned current with a current derived from one of said resonant circuits to obtain a control potential from the combined current, and an indicator operated in synchronism with the phase rotation of said further current and adapted to be controlled by the said control potential to indicate the direction of arrival of said radio signal.

4. In a directive radio system, a pair of frame aerials arranged at a right angle relative to each other, resonant circuits connected to each of said aerials tuned to the frequency of an incoming radio signal, inductance coils inserted in each of said resonant circuits and arranged in mutual coupling relation, the non-reactive impedances of said circuits being equal to each other and to the mutual coupling inductance of said coils, whereby currents having a definite time phase position are set up in said resonant circuits depending on the direction of arrival of said radio signal, a non-directional aerial, a receiving circuit connected to said non-directional aerial, means for periodically shifting the time phase position of the current in said receiving circuit derived from the same radio signal in opposite directions at a predetermined rate, an indicator rotating in synchronism with said last mentioned means, means for combining the current in said receiving circuit with the current derived from one of said resonant circuits, and means for controlling said indicator in accordance with the amplitude of the combined current to indicate the direction of arrival of said radio signal.

5. In a directive radio system, a pair of frame aerials arranged at a right angle relative to each other, resonant circuits connected to each of said aerials tuned to the frequency of an incoming radio signal, a coupling transformer having its primary inserted in one of said resonant circuits and having its secondary inserted in the other resonant circuit, the non-reactive impedances of said resonant circuits being equal to each other and to the mutual coupling inductance of said transformer, whereby currents having a definite time phase position are set up in each of said circuits depending on the direction of arrival of said radio signal, a non-directional aerial, a phase shifting device comprising a primary inductance coil arranged to be energized by currents received by said non-directional aerial originating from the same radio signal, a pair of secondary inductance coils arranged coaxially and fixed at a right angle relative to each other, said secondary inductance coils being in coupling relation with said primary inductance coil, means for producing a continuous relative rotation between said primary inductance coil and said secondary inductance coils, a luminous indicator arranged to rotate in synchronism with said last mentioned means, and means for controlling the brightness of said indicator in accordance with the amplitudes of a current derived by combination of a current derived from one of said resonant circuits and the current in one of said secondary inductance coils.

6. In a directive radio system, a pair of frame aerials arranged at right angle relative to each other, resonant circuits connected to each of said aerials tuned to the frequency of an incoming radio signal, a transformer having its primary inserted in one of said resonant circuits and having its secondary inserted in the other resonant circuit, the non-reactive impedances of said circuits being equal to each other and to the mutual coupling inductance of said transformer, whereby currents having a definite time phase position are set up in said circuits depending on the direction of arrival of the received radio signals, non-directional receiving means for producing a current from the same radio signal independently of the direction, means for continuously rotating the phase vector of said last mentioned current, said means comprising a primary inductance coil arranged to be energized by said non-directionally received current, a pair of secondary inductance coils arranged coaxially and fixed at a right angle relative to each other, said secondary inductance coils being in coupling relation with said primary inductance coil, means for producing a continuous relative rotation between said primary and secondary inductance coils, a luminous indicator arranged to rotate in synchronism with said last mentioned means, further means for combining a current derived from one of said resonant circuits with a current derived from one of said secondary inductance coils, means for rectifying the combined current and for controlling said indicator in accordance with the rectified current to indicate the direction of arrival of said radio signal.

7. In a directive radio system, a pair of frame aerials arranged at a right angle relative to each other, resonant circuits connected to each of said aerials tuned to the frequency of an incoming radio signal, a coupling transformer having its primary connected in one of said resonant circuits and having its secondary connected to the other resonant circuit, the non-reactive impedances of said resonant circuits being equal to each other and to the mutual coupling inductance of said transformer, whereby currents having a definite phase vector position are set up in said resonant circuits depending on the direction of arrival of the received radio signal, means for producing a further signalling current derived from the same non-directionally received radio signal, means for continuously rotating the phase vector of said further signal current, said last mentioned means comprising a first inductance coil arranged to be energized by said further signal current, a pair of secondary inductance coils arranged coaxially and fixed at a right angle relative to each other, said secondary inductance coils being in coupling relation with said primary inductance coil, means for producing a continuous relative rotation between said primary and secondary inductance coils, a neon tube indicator arranged to rotate in synchronism with said last mentioned means, means for combining a current derived from one of said resonant circuits with a current derived from one of said secondary inductance coils, means for rectifying the combined current, and means for controlling said neon tube indicator in accordance with the rectified current.

8. In a directive radio system, a pair of frame aerials arranged at a right angle relative to each other, resonant circuits connected to each of said aerials tuned to the frequency of an incoming radio signal, a coupling transformer having its primary connected in one of said resonant circuits and having its secondary connected in the other resonant circuit, the non-reactive impedances of said resonant circuits being equal to each other and to the mutual coupling inductance of said transformer, whereby currents having a definite time phase position are set up in said resonant circuits depending on the direction of arrival of the received radio signals, non-directional receiving means for producing a further signal current derived from the same radio signal, means for continuously rotating the phase vector of said last mentioned signal current, said last mentioned means comprising means for producing components in quadrature phase relation from said further signal current, means for locally producing a pair of modulating currents in phase quadrature relation and having a frequency lower than the signal frequency, means for modulating said quadrature signal current components by the corresponding locally produced quadrature modulating current components, a pair of circuits arranged to receive the modulated currents, a mutual coupling element interconnecting said last mentioned circuits, the non-reactive impedances of said last mentioned circuits being equal to each other and to the mutual coupling impedance of said element, means for combining the current produced in one of said last mentioned circuits with the current produced in one of said resonant circuits, means for rectifying the combined current, an indicator arranged to operate synchronously with the frequency of said modulating currents, and means for utilizing said rectified current to control said indicator to indicate the direction of arrival of said radio signal.

9. In a system as claimed in claim 8 in which said indicator is comprised of a cathode ray tube having a pair of deflecting means adapted to deflect the cathode ray at right angles, and means for controlling said deflecting means by quadrature voltages derived from said local modulating currents, and a control element adapted to control the intensity of the cathode ray in accordance with said rectified current.

10. In a system as claimed in claim 8 in which said indicator is comprised of a cathode ray tube having two pairs of electrostatic deflecting plates arranged at right angles, means for controlling said deflecting plates by quadrature voltages in synchronism with said local modulating currents, and a control grid adapted to vary the intensity of the cathode ray in accordance with said rectified current.

11. In a directive radio system, a pair of frame aerials arranged at a right angle relative to each other, resonant circuits connected to each of said aerials tuned to the frequency of an incoming radio signal, a coupling transformer having its primary inserted in one of said resonant circuits and having its secondary inserted in the other resonant circuit, the non-reactive impedances of said resonant circuits being equal to each other and to the mutual coupling inductance of said transformer, whereby currents having a definite time phase vector position are set up in said resonant circuits dependent on the direction of arrival of the received radio signals, non-directional receiving means for producing a further signal current derived from the same radio signal, means for producing a continuous rotation of the time phase vector of said last mentioned signal current, said last mentioned means comprising circuit means for deriving signal current components in quadrature phase relation from said non-directionally received signal current, means for producing a pair of local modulating currents having a phase quadrature relation to each other and a frequency lower than the signal frequency, means for modulating said quadrature signal current components by the corresponding quadrature modulating current components, a pair of circuits arranged to receive the modulated currents, a mutual coupling element interconnecting said last mentioned circuits, the non-reactive impedances of said last mentioned circuits being equal to each other and to the mutual coupling impedance of said element, means for combining a current in one of said last mentioned circuits with the current in one of said first mentioned resonant circuits, means for rectifying the combined current, an indicator arranged to operate synchronously with the frequency of said modulating currents, means for utilizing said rectified current to control said indicator to indicate the direction of arrival of said radio signal, and further means for momentarily rendering said last mentioned control means inoperative immediately after reception of each signal impulse.

12. In a directive radio system, a pair of frame aerials arranged at a right angle relative to each other, resonant circuits connected to each of said aerials tuned to the frequency of an incoming radio signal, a coupling transformer having its primary inserted in one of said resonant circuits and having its secondary inserted in the other resonant circuit, the non-reactive impedances of said resonant circuits being equal to each other and to the mutual coupling inductance of said transformer, whereby currents having a definite time phase vector position are set up in said resonant circuits dependent on the direction of arrival of the received radio signals, a non-directional receiving means for producing a further signal current derived from the same radio signal, means for producing a continuous rotation of the time phase vector of said last mentioned signal current, said last mentioned means comprising circuit means for deriving signal current components in quadrature phase relation from said non-directionally received signal current, means for producing a pair of local modulating currents having a phase quadrature relation to each other and a frequency lower than the signal frequency, means for modulating said quadrature signal current components by the corresponding quadrature modulating current components, a pair of circuits arranged to receive the modulated currents, a mutual coupling element interconnecting said last mentioned circuits, the non-reactive impedances of said last mentioned circuits being equal to each other and to the mutual coupling impedance of said element, means for combining the current in one of said last mentioned circuits with the current in one of said first mentioned resonant circuits, means for rectifying the combined current, a cathode ray device having means for producing a concentrated electron beam, a fluorescent screen arranged to be impinged by said beam, a pair of deflecting means adapted to deflect said beam at right angles, means for controlling said deflecting means by deflecting potentials in quadrature phase relation and in synchronism with said modulating currents to produce a continuous rotation of the luminous recording spot produced upon said screen, a control element for said cathode ray device adapted to control the intensity of said cathode ray, means for controlling said control element in accordance with variations of said rectified current, a relay device adapted to impress a negative control potential upon said grid at the beginning of each received signal impulse, and delay means for said relay device for momentarily delaying the removal of said negative potential upon cessation of each received signal impulse.

13. A method of radio direction finding comprising the steps of absorbing signal energy of varying amplitude which bears a predetermined relation to the direction of arrival of the signal, converting said energy into energy of substantially constant amplitude and having a phase varying according to the original amplitude variations, separately receiving further energy from the same signal of substantially constant amplitude and phase, periodically varying the phase of said last mentioned energy at a predetermined rate, and combining said energies and producing a signal by the combined energies at a predetermined phase relation therebetween corresponding to the incoming signal direction.

14. A system for directionally receiving a radio signal comprising a pair of directional antennae arranged with their lines of maximum receptivity forming an angle with each other, resonant receiving circuits connected to each of said antennae, coupling means mutually connecting said circuits to produce signal energies of substantially equal amplitude and having a phase which bears a predetermined relation to the direction of arrival of the signal received, and means for utilizing the energy in at least one of said circuits for determining the direction of arrival of said signal.

15. A system for directionally receiving a radio signal comprising a pair of directional antennae arranged with their lines of maximum receptivity forming a fixed angle with each other, resonant receiving circuits connected to said antennae, coupling means mutually connecting said circuits to produce signal energies therein of substantially equal amplitude and varying phase which bears a predetermined relation to the direction of arrival of the signal, an omnidirectional antenna, and means for combining the energy in one of said circuits with energy received by said omni-directional antenna for determining the direction of arrival of said signal.

16. The method of radio direction finding comprising the steps of absorbing signal energy whose magnitude bears a definite relation to the direction of arrival of the signal, converting said energies into energy of substantially constant magnitude and varying phase corresponding to the original amplitude variations, separately absorbing further energy from the same signal of substantially constant amplitude and phase independently of the direction of arrival of the signal, periodically varying the phase of said last mentioned energy between 0 and 360° at a predetermined rate, and combining said energies and producing a signal by the combined energies at a predetermined phase relation therebetween corresponding to the incoming signal direction.

17. In a system for directionally receiving radio signal impulses, a rotating indicator, means for producing signal energy having a characteristic varying in synchronism with the rotation of said indicator and having a time phase relation to the rotation of said indicator which bears a predetermined relation to the direction of arrival of the signal being received, means for controlling said indicator by said signal energy to effect an indication at definite instants during its rotation cycles, and means for momentarily rendering said indication ineffective upon reception of each signal impulse.

18. In a system for directionally receiving radio signal impulses, a periodically moving indicator, means for producing signal energy having a characteristic varying in synchronism with the movement of said indicator and having a time phase relation to the rotation of said indicator which bears a predetermined relation to the direction of arrival of the signal being received, means for controlling a physical characteristic of said indicator by the received energy to effect an indication at definite instants during its rotation cycles, and means including a time delay network for momentarily rendering said indication ineffective upon reception of each signal impulse.

19. In a system for directionally receiving radio signal impulses, a periodically moving indicator, means for generating signal energy of periodically varying amplitude in synchronism with the movement of said indicator and having a time phase relation to the moving cycles of said indicator which bears a predetermined relation to the direction of arrival of the signal being received, means for controlling a physical characteristic of said indicator by said signal energy to effect an indication at definite instants during its moving cycles, and means for momentarily rendering said indicator ineffective upon commencement of a control by a received signal impulse.

20. In a system for directionally receiving radio signal impulses, a periodically moving luminous indicator, means for producing signal energy having an amplitude varying in synchronism with said indicator and having a time phase relation in respect to the moving cycles of said indicator which bears a predetermined relation to the direction of arrival of the signal being received, means for controlling the brightness of said indicator by said signal energy to effect an indication at definite instants during its moving cycles, and means including a time delay network for momentarily rendering said indicator ineffective immediately upon commencement of a control by a received signal impulse.

21. A direction finding radio receiver arrangement comprising a cathode ray tube including means for generating an electron ray, a luminescent screen impinged by said electron ray, means for continuously deflecting said electron ray to move the luminous spot produced on said screen around a substantially circular path, an omni-directional aerial, phase shifting means for periodically rotating the phase of signal energy received by said omni-directional aerial in synchronism with the rotation of said electron ray, a directional aerial, means for converting variable amplitude signal energy received from different directions by said directional aerial into energy of substantially constant amplitude and having a phase varying according to the original amplitude variations, a circuit for combining the energies received by said omni-directional aerial and by said directional aerial, and means for utilizing the combined signals to control the intensity of said electron ray so as to produce a sharp and easily visible change on the spot on said luminous screen when said ray is in a position in the circular path corresponding to the incoming signal direction.

22. A direction finding radio receiver arrangement comprising a cathode ray tube comprising means for generating an electron ray, a luminescent screen impinged by said electron ray, means for periodically deflecting said electron ray to move the luminous spot produced upon said screen along a predetermined path, a first receiver comprising a fixedly mounted directional aerial and means for producing signal energy from an incoming radio wave having a phase varying according to the direction of said wave, a second receiver comprising an omni-directional aerial and means for producing signal energy having a phase which varies continuously and periodically in synchronism with the movement of said luminescent spot, means for combining the signal energies received by said directional and said non-directional aerials into a combined signal, and means for utilizing the combined signal to control the intensity of said electron ray so as to produce an easily visible change in said luminous spot when said ray is in a position in its moving path corresponding to the incoming signal direction.

23. A direction finding radio receiver arrangement comprising a cathode ray tube having means for generating an electron ray, a luminescent screen impinged by said electron ray, means for deflecting said ray in mutually perpendicular component directions, a local oscillator, means for phase splitting oscillations derived from said oscillator to produce oscillations in quadrature, means for applying said phase quadrature oscillations to said deflecting means to provide a rotary field deflecting said electron ray along a substantially circular path, an omni-directional aerial, means for periodically shifting the phase of signal energy received by said omni-directional aerial in synchronism with the rotation of said electron ray, a directional aerial, means for converting signal energy of varying amplitude received from different directions by said directional aerial into energy of substantially constant amplitude and having a phase varying in accordance with the original amplitude variations, a circuit for combining the energies received by said omni-directional aerial and said directional aerial, and means for utilizing the combined signals to control the intensity of said electron ray so as to produce a sharp and easily visible change in the luminous spot when said ray is in a position in its circular path corresponding to the incoming signal direction.

24. An arrangement as claimed in claim 23 wherein the combined signals are utilized to control said electron ray to produce a gap in the circular path on said fluorescent screen at a point corresponding to the incoming signal direction.

25. An arrangement as claimed in claim 23 comprising a control element adapted to control the intensity of said electron ray, means for rectifying said combined signal and for impressing a potential derived from the rectified signal upon said control element.

26. An arrangement as claimed in claim 23 including a delayed action relay operated by the combined signal and adapted to free the cathode ray tube from ray intensity control by said combined signal after a very short time interval upon the commencement of each signal, and means for returning said tube to control condition for the next signal upon cessation of the preceding signal.

JOZEF PLEBANSKI.